United States Patent
Gao et al.

(10) Patent No.: US 12,347,160 B2
(45) Date of Patent: Jul. 1, 2025

(54) OPTIMIZATION METHOD, APPARATUS, DEVICE FOR CONSTRUCTING TARGET DETECTION NETWORK, MEDIUM AND PRODUCT

(71) Applicant: PEKING UNIVERSITY SHENZHEN GRADUATE SCHOOL, Shenzhen (CN)

(72) Inventors: Wei Gao, Shenzhen (CN); Guibiao Liao, Shenzhen (CN); Ge Li, Shenzhen (CN)

(73) Assignee: PEKING UNIVERSITY SHENZHEN GRADUATE SCHOOL, Shenzhen (CN)

(*) Notice: Subject to any disclaimer, the term of this patent is extended or adjusted under 35 U.S.C. 154(b) by 354 days.

(21) Appl. No.: 17/747,721

(22) Filed: May 18, 2022

(65) Prior Publication Data
US 2022/0375192 A1 Nov. 24, 2022

Related U.S. Application Data

(63) Continuation of application No. PCT/CN2021/093911, filed on May 14, 2021.

(51) Int. Cl.
*G06V 10/46* (2022.01)
*G06V 10/774* (2022.01)
*G06V 10/82* (2022.01)

(52) U.S. Cl.
CPC .......... *G06V 10/462* (2022.01); *G06V 10/774* (2022.01); *G06V 10/82* (2022.01)

(58) Field of Classification Search
CPC .... G06V 10/774; G06V 10/82; G06V 10/462; G06V 10/7788; G06V 20/46;
(Continued)

(56) References Cited

U.S. PATENT DOCUMENTS

| 2019/0213474 A1 | 7/2019 | Lin et al. |
| 2020/0387750 A1* | 12/2020 | Shcherbinin ........ G06F 18/214 |
| 2022/0044366 A1* | 2/2022 | Zhang ....................... G06T 7/12 |

FOREIGN PATENT DOCUMENTS

| CN | 109064428 A | 12/2018 |
| CN | 109508580 A | 3/2019 |

(Continued)

OTHER PUBLICATIONS

International Search Report and Written Opinion issued in corresponding PCT Application No. PCT/CN2021/093911, dated Feb. 11, 2022.

(Continued)

*Primary Examiner* — Kenny A Cese
(74) *Attorney, Agent, or Firm* — Westbridge IP LLC

(57) ABSTRACT

Disclosed is an optimization method for constructing a target detection network. The method includes: obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data; constructing a feature correlation loss, a salient target position loss and a salient prediction loss based on the first backbone network side output feature, the second backbone network side output feature, and the true label; and optimizing the preset target detection network to be trained based on the feature correlation loss, the salient target position loss, and the salient prediction loss to obtain the target detection network.

11 Claims, 7 Drawing Sheets

(58) Field of Classification Search
CPC .... G06V 40/16; G06V 40/171; G06F 16/784;
G06F 18/214; G06N 3/045; G06N 3/08;
G06N 3/084
See application file for complete search history.

(56) References Cited

FOREIGN PATENT DOCUMENTS

| | | |
|---|---|---|
| CN | 111340850 A | 6/2020 |
| CN | 112183224 A | 1/2021 |
| DE | 102018220274 A1 | 5/2020 |
| WO | 2020109016 A1 | 6/2020 |

OTHER PUBLICATIONS

First Office Action issued in counterpart Chinese Patent Application No. 202180001203.0, dated Oct. 9, 2024.

* cited by examiner

OPTIMIZATION METHOD, APPARATUS, DEVICE FOR CONSTRUCTING TARGET DETECTION NETWORK, MEDIUM AND PRODUCT

CROSS-REFERENCE TO RELATED APPLICATIONS

This application is a continuation application of PCT Application No. PCT/CN2021/093911, filed on May 14, 2021, the entire disclosure of which is incorporated herein by reference.

TECHNICAL FIELD

The present disclosure relates to the technical field of image processing, and in particular, to an optimization method, an optimization apparatus, an optimization device for constructing a target detection network, a medium and a product.

BACKGROUND

With the continuous development of computer software, artificial intelligence, and big data cloud service applications, the application of image processing technology is becoming increasingly extensive. Salient target detection is widely used in computer vision tasks such as detection, segmentation, and compression. Current salient target detection networks are usually constructed based on high-quality visual media data. Visual media data includes images, point clouds, and videos, or the like. For example, the images that can accurately detect salient targets by image salient target detection network based on multi-scale fusion, image salient target detection network based on edge information guidance, and image salient target detection network based on attention response are only high-quality clean images. Therefore, the existing salient target detection network is highly dependent on high-quality visual media data, which is difficult to accurately detect salient targets on low-quality visual media data, and the detection accuracy of existing salient target detection networks is low.

SUMMARY

The main objective of the present disclosure is to provide an optimization method, an optimization apparatus, an optimization device for constructing a target detection network, a medium and a product, aiming to solve the technical problem of low detection accuracy of a salient target detection network in the prior art.

In order to achieve the above objective, the present disclosure provides an optimization method for constructing a target detection network, applied to an optimization device for constructing a target detection network, including:

obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data;

constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label; and optimizing the preset target detection network to be trained based on the feature correlation loss, the salient target position loss, and the salient prediction loss to obtain the target detection network.

The present disclosure further provides an optimization apparatus for constructing a target detection network. The optimization apparatus for constructing the target detection network is a virtual device, and is applied to an optimization device for constructing a target detection network. The optimization apparatus for constructing the target detection network includes:

an extraction module for obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data;

a loss construction module for constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label; and an optimization module for optimizing the preset target detection network to be trained based on the feature correlation loss, the salient target position loss, and the salient prediction loss to obtain the target detection network.

The present disclosure further provides an optimization device for constructing a target detection network. The optimization device for constructing a target detection network is a physical device, and includes a memory, a processor, a program stored on the memory for implementing an optimization method for constructing a target detection network, the memory is configured for storing a program for implementing the optimization method for constructing the target detection network, the processor is configured to execute the program for implementing the optimization method for constructing the target detection network, to perform operations of the optimization method for constructing the target detection network as described above.

The present disclosure further provides a medium, which is a non-transitory computer readable storage medium. A program for implementing an optimization method for constructing a target detection network is stored on the non-transitory computer readable storage medium, and a processor is configured to execute the program for implementing the optimization method for constructing the target detection network, to perform operations of the optimization method for constructing the target detection network as described above.

The present disclosure further provides a product, the product is a computer program product comprising a computer program, and a processor is configured to execute the computer program to perform operations of the optimization method for constructing the target detection network as described above.

The present disclosure provides an optimization method, an optimization apparatus, an optimization device for constructing a target detection network, a medium and a product. Compared with the technical means of salient target detection based on high-quality clean images adopted in the prior art, the optimization method for constructing the target detection network proposed by the present disclosure includes: obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data; constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label; and optimizing the preset target detection network to be trained based on the feature correlation loss, the salient target position loss, and the salient prediction loss. It can achieve the purpose of transferring the prior information in the preset prior network to the preset target detection network to be trained through the feature correlation loss, to ensure that the features extracted from the low-quality visual media data by the preset target detection network to be trained are as close as possible to the features extracted from the high-quality visual media data by the preset prior network, and can achieve the purpose of ensuring the consistency of the position of the salient target in the positioning image of the preset prior network and the preset target detection network to be trained through the salient target position loss. The purpose of ensuring the prediction accuracy of the preset target detection network to be trained compared to the true label is achieved through the salient prediction loss. Then, the target detection network that has learned the knowledge of the prior network is obtained. Thus, the target detection network can perform accurate salient target detection on low-quality visual media data just as the preset prior network can perform accurate salient target detection on high-quality visual media data, which does not need to rely on high-quality visual media data for salient target detection. Therefore, it overcomes the difficulty of accurately detecting the salient target on the low-quality visual media data due to the high dependence of the existing salient target detection network on the high-quality clean image. Furthermore, the technical defect of the existing salient target detection network having low detection accuracy for the low-quality visual media data is overcome, so the detection accuracy of the salient target detection network is improved.

BRIEF DESCRIPTION OF THE DRAWINGS

The accompanying drawings, which are incorporated in and constitute a part of this specification, illustrate embodiments consistent with the present disclosure and together with the description to explain the principles of the present disclosure.

In order to more clearly illustrate the embodiments of the present disclosure or the technical solutions in the prior art, the following briefly introduces the accompanying drawings that need to be used in the description of the embodiments or the prior art. Obviously, for those of ordinary skill in the art, other drawings can also be obtained from these drawings without any creative effort.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, and not to limit the present disclosure.

Figure 1:
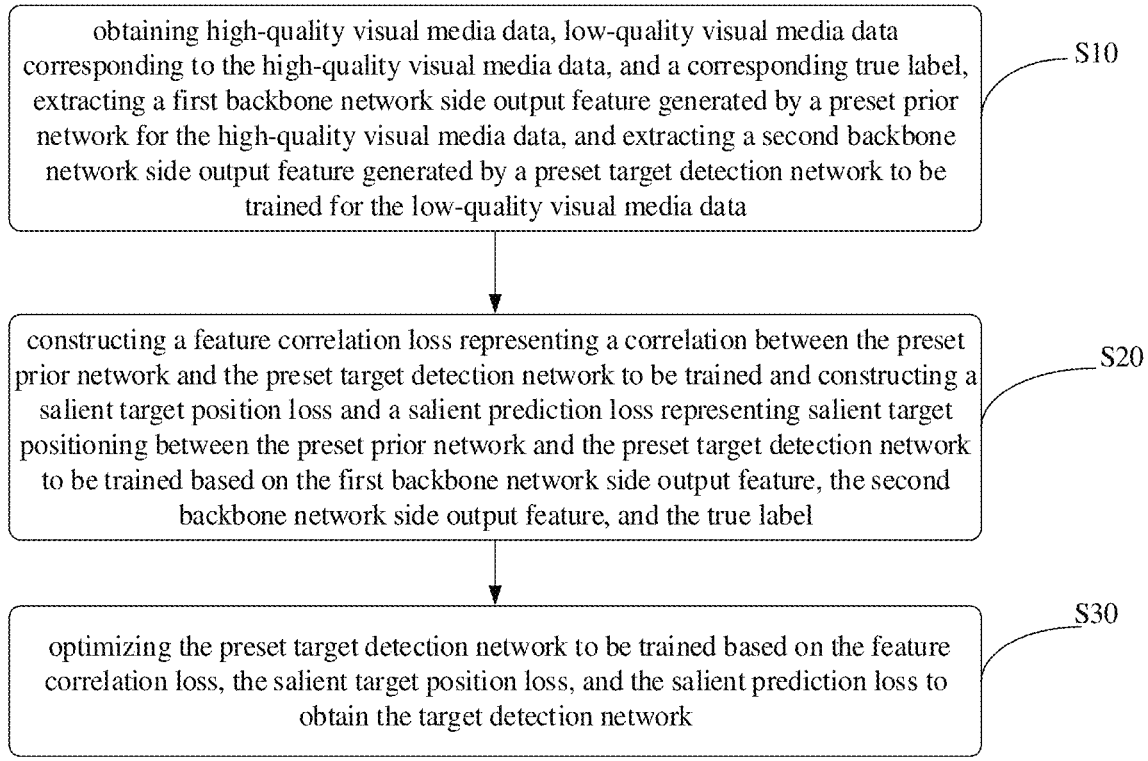
FIG. 1 is a schematic flowchart of an optimization method for constructing a target detection network according to an embodiment of the present disclosure.

The present disclosure provides an optimization method for constructing a target detection network. According to an embodiment of the present disclosure, as shown in FIG. 1, the optimization method for constructing the target detection network includes following operations:

Operation S10, obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data.

In this embodiment, it should be noted that the high-quality visual media data is the visual media data whose quality index value exceeds a preset quality index threshold. The visual media data can be videos, point clouds or images, or the like. The low-quality visual media data is the visual media data for which the quality index value generated by the high-quality visual media data in the preset scene does not exceed the preset quality index threshold. The preset scene includes compression distortion, compression resolution, motion blur, and Gaussian blur. The preset quality index value is a value indicating the quality of the visual media data. For example, the preset quality index value can be the quantization parameter QP in the compression distortion scene, which is used to measure the degree of compression distortion, and can also be set as the Gaussian blur kernel σ in the Gaussian blur scene, which is used to measure the degree of Gaussian blur. The content in the low-quality visual media data is identical to the content in the high-quality visual media data, but there is a difference in quality.

In addition, it should be noted that the preset prior network is a salient target detection network constructed in advance based on the high-quality clean image. The preset prior network has the ability to accurately detect salient targets for the high-quality clean image. The model input of the preset prior network is high-quality visual media data. The preset target detection network to be trained is an untrained salient target detection network constructed based on low-quality visual media data. The preset model input of the target detection network to be trained is low-quality visual media data.

Specifically, the target image and the compressed image corresponding to the target image are acquired, and the target image is regarded as high-quality visual media data, and the compressed image is regarded as low-quality visual media data. Then, after inputting the high-quality visual media data into the preset prior network, it is possible to extract the backbone network side output feature generated by the preset prior network for the high-quality visual media data, and obtain the first backbone network side output feature. After inputting the low-quality visual media data into the preset target detection network to be trained, it is possible to extract the backbone network side output feature generated by the preset target detection network to be trained for the low-quality visual media data, and obtain the second backbone network side output feature. The first backbone network side output feature is the output of the middle hidden layer of the preset prior network. The second backbone network side output feature is the output of the middle hidden layer of the preset target detection network to be trained. For example, assuming that the preset prior network is ResNet, the outputs of layer 1, layer 2, layer 3, and layer 4 in ResNet can be set to be the side output features of the first backbone network.

Operation S20, constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label.

In this embodiment, it should be noted that the feature correlation loss is the loss representing the correlation between the preset prior network and the preset target detection network to be trained. The salient target position loss is the loss that represents the difference degree between the position of the salient target obtained by the salient target localization performed degree by the preset prior network and the position of the salient target obtained by the salient target location obtained by the preset target detection network to be trained. The salient prediction loss is the loss that represents the difference degree between the predicted label corresponding to the salient prediction result of the preset prior network and the true label.

Besides, it should be noted that the first backbone network side output feature includes at least a first network high-level feature. The first network high-level feature is the feature of the output of the network layer after the network level in the preset prior network exceeds the preset network level threshold. The second backbone network side output feature includes at least a second network high-level feature. The second network high-level feature is the feature of the output of the network layer after the network level in the preset target detection network to be trained exceeds the preset network level threshold. For example, assuming that the preset prior network is ResNet, the outputs of layer 2, layer 3, and layer 4 in ResNet can be set as the high-level features of the first network.

Specifically, based on the difference degree between the first backbone network side output feature and the second backbone network side output feature, it is possible to construct a feature correlation loss representing the correlation between the preset prior network and the preset target detection network to be trained, integrate the high-level features of each first network into the first salient prediction result, and integrate the high-level features of each second network into the second salient prediction result. Thus, it is possible to construct the salient target position loss representing salient target positioning between the preset prior network and the preset target detection network to be trained based on the difference degree between the output of the first salient target channel corresponding to the salient target in the first salient prediction result and the output of the second salient target channel corresponding to the salient target in the second salient prediction result, and construct the salient prediction loss based on the difference degree between the predicted label corresponding to the first salient prediction result and the true label.

Operation S30, optimizing the preset target detection network to be trained based on the feature correlation loss, the salient target position loss, and the salient prediction loss to obtain the target detection network.

In this embodiment, specifically, based on the feature correlation loss, the salient target position loss and the salient prediction loss, the preset network update method is used to optimize the preset target detection network to be trained, and the target detection network is obtained. The preset network update methods include gradient descent and gradient ascent.

In addition, the operation S30 further includes:

The weighted summation of the feature correlation loss, the salient target position loss and the salient prediction loss is performed to obtain the total model loss, and then based on the total model loss, the preset target detection network to be trained is optimized to obtain the target detection network.

It should be noted that the feature correlation loss is the loss of feature expression in the middle hidden layer of the preset prior network to make the target detection network to be trained to learn the preset prior network. The salient target position loss is the loss of knowledge that prompts the preset target detection network to be trained to learn the preset prior network for salient target location, thereby optimizing the preset target detection network to be trained based on the feature correlation loss, the salient target position loss, and the salient prediction loss. It can realize the supervised learning of the preset target detection network to be trained based on the true label, and can also prompt the preset target detection network to be trained to learn the feature expression of the intermediate hidden layer of the preset prior network and the knowledge of how to locate the salient target, which ensuring that the features extracted from the low-quality visual media data by the preset target detection network to be trained are as close as possible to the features extracted from the high-quality visual media data by the preset prior network, and ensuring the consistency of the preset prior network and the preset target detection network to be trained to locate the position of the salient target in the image. Thus, the target detection network can perform accurate salient target detection on low-quality visual media data just as the preset prior network performs accurate salient target detection on high-quality visual media data. There is no need to rely on high-quality visual media data for salient target detection, so the accuracy of the salient target detection network is improved.

Figure 2:
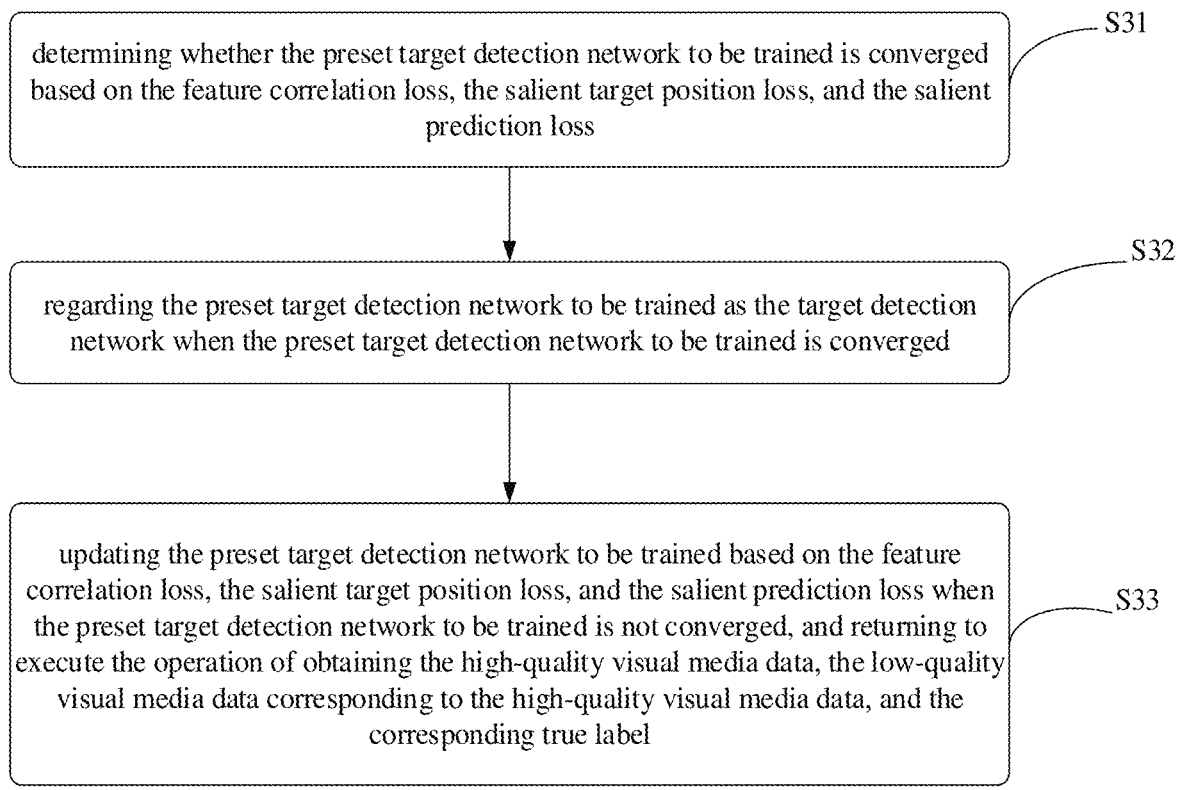
FIG. 2 is a schematic flowchart of the optimization method for constructing the target detection network according to another embodiment of the present disclosure.

As shown in FIG. 2, the operation of optimizing the preset target detection network to be trained based on the feature correlation loss, the salient target position loss, and the salient prediction loss, to obtain the target detection network includes:

Operation S31, determining whether the preset target detection network to be trained is converged based on the feature correlation loss, the salient target position loss, and the salient prediction loss.

In this embodiment, determining whether all of the feature correlation loss, the salient target position loss, and the salient prediction loss converge. If all of the feature correlation loss, the salient target position loss and the salient prediction loss converge, it is determined that the preset target detection network to be trained is converged. If not all of the feature correlation loss, the salient target position loss, and the salient prediction loss converge, it is determined that the preset target detection network to be trained is not converged.

Operation S32, regarding the preset target detection network to be trained as the target detection network when the preset target detection network to be trained is converged.

Operation S33, updating the preset target detection network to be trained based on the feature correlation loss, the salient target position loss, and the salient prediction loss when the preset target detection network to be trained is not converged, and returning to execute the operation of obtaining the high-quality visual media data, the low-quality visual media data corresponding to the high-quality visual media data, and the corresponding true label.

In this embodiment, when the preset target detection network to be trained is converged, the preset target detection network to be trained is directly used as the target detection network. When the preset target detection network to be trained is not converged, through the preset network update method, the preset target detection network to be trained is updated based on the feature correlation loss, the salient target position loss, and the salient prediction loss, and return to execute the operation of obtaining the high-quality visual media data, the low-quality visual media data corresponding to the high-quality visual media data, and the corresponding true label, until the preset target detection network to be trained is converged, to obtain the target detection network.

The present disclosure provides an optimization method for constructing a target detection network. Compared with the technical means of salient target detection based on the high-quality clean image in the prior art, the optimization method for constructing the target detection network proposed by the present disclosure includes: obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data; constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label; and optimizing the preset target detection network to be trained based on the feature correlation loss, the salient target position loss, and the salient prediction loss. It can achieve the purpose of transferring the prior information in the preset prior network to the preset target detection network to be trained through the feature correlation loss, to ensure that the features extracted from the low-quality visual media data by the preset target detection network to be trained are as close as possible to the features extracted from the high-quality visual media data by the preset prior network, and can achieve the purpose of ensuring the consistency of the position of the salient target in the positioning image of the preset prior network and the preset target detection network to be trained through the salient target position loss. The purpose of ensuring the prediction accuracy of the preset target detection network to be trained compared to the true label is achieved through the salient prediction loss. Then, the target detection network that has learned the knowledge of the prior network is obtained. Thus, the target detection network can perform accurate salient target detection on low-quality visual media data just as the preset prior network can perform accurate salient target detection on high-quality visual media data, which does not need to rely on high-quality visual media data for salient target detection. Therefore, it overcomes the difficulty of accurately detecting the salient target on the low-quality visual media data due to the high dependence of the existing salient target detection network on the high-quality clean image. Furthermore, the technical defect of the existing salient target detection network having low detection accuracy for the low-quality visual media data is overcome, so the detection accuracy of the salient target detection network is improved.

Figure 3:
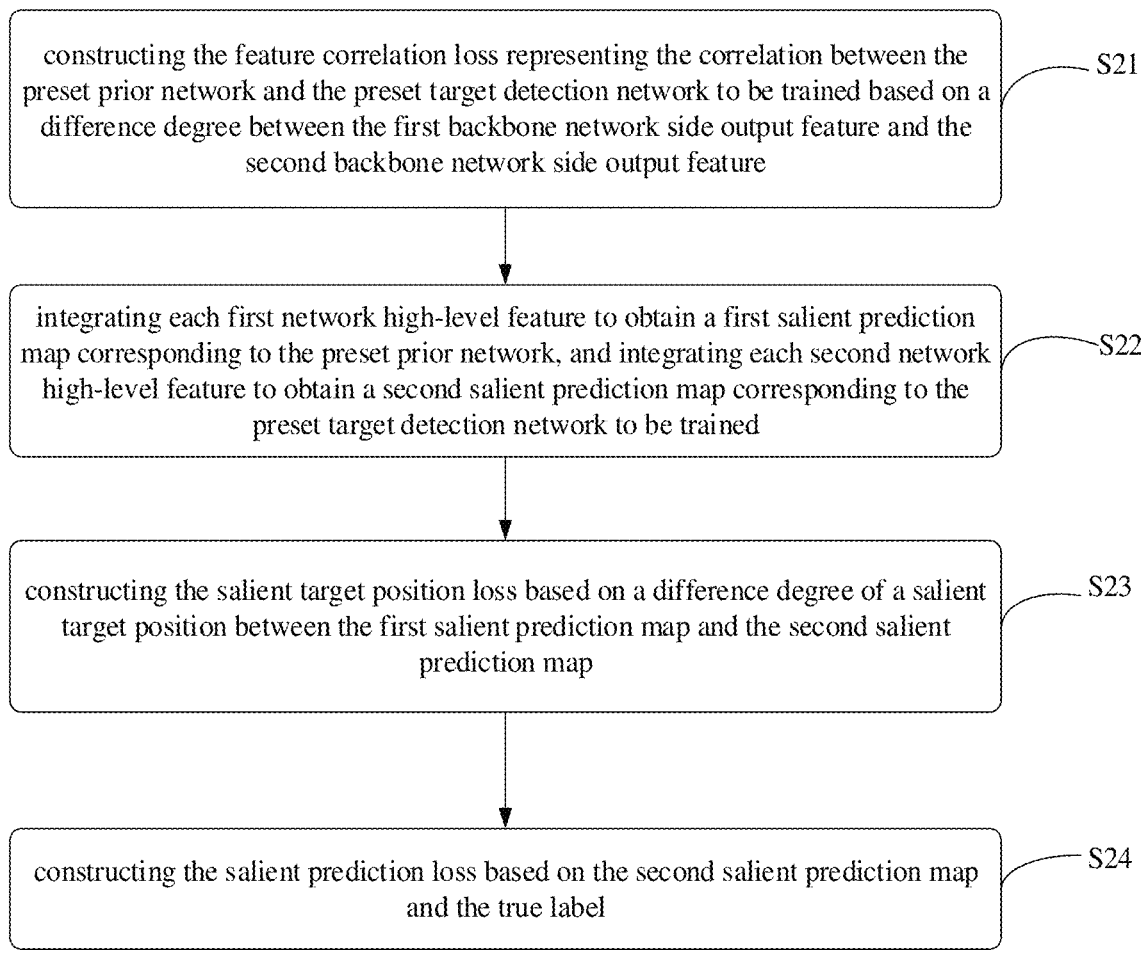
FIG. 3 is a schematic flowchart of the optimization method for constructing the target detection network according to another embodiment of the present disclosure.

Further, as shown in FIG. 3, in another embodiment of the present disclosure, the first backbone network side output feature includes at least a first network high-level feature, and the second backbone network side output feature includes at least a second network high-level feature, the operation of constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label includes:

Operation S21, constructing the feature correlation loss representing the correlation between the preset prior network and the preset target detection network to be trained based on a difference degree between the first backbone network side output feature and the second backbone network side output feature.

In this embodiment, it should be noted that the feature correlation loss includes local feature correlation loss and global feature correlation loss.

Specifically, a local feature correlation loss representing the local correlation between the preset prior network and the preset target detection network to be trained is constructed based on the local difference degree between the first backbone network side output feature and the second backbone network side output feature, and a global feature correlation loss representing the global correlation between the preset prior network and the preset target detection network to be trained is constructed based on the global difference degree between the first backbone network side output feature and the second backbone network side output feature.

Figure 4:
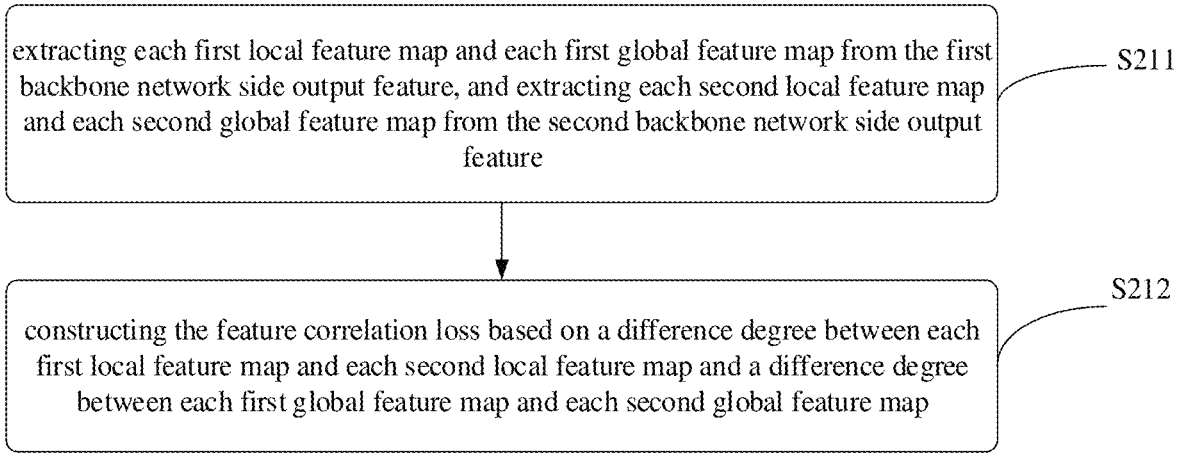
FIG. 4 is a schematic flowchart of the optimization method for constructing the target detection network according to another embodiment of the present disclosure.

As shown in FIG. 4, the operation of constructing the feature correlation loss representing the correlation between the preset prior network and the preset target detection network to be trained based on a difference degree between the first backbone network side output feature and the second backbone network side output feature includes:

Operation S211, extracting each first local feature map and each first global feature map from the first backbone network side output feature, and extracting each second local feature map and each second global feature map from the second backbone network side output feature.

In this embodiment, it should be noted that the first backbone network side output feature includes at least a first level output feature. Different first-level output features are output by different levels of hidden layers of the preset prior network. The second backbone network side output feature includes at least a second level output feature. Different second-level output features are output by different levels of hidden layers of the preset target detection network to be trained.

Specifically, a square pooling operation with a corresponding preset pooling kernel size is performed on each first-level output feature to obtain a first local feature expression corresponding to each first-level output feature, and the first numerical statistical value corresponding to each first local feature expression is calculated respectively in the channel dimension. That is, the region matrix of each first local feature expression is summed in the channel dimension to obtain the first numerical statistical value corresponding to each first local feature expression, and each first numerical statistical value is normalized to obtain a first local feature map. Similarly, a square pooling operation with a corresponding preset pooling kernel size is performed on each second-level output feature to obtain a second local feature expression corresponding to each second-level output feature, and the second numerical statistical value corresponding to each second local feature expression is calculated respectively in the channel dimension. That is, the region matrix of each second local feature expression is summed in the channel dimension to obtain the second numerical statistical value corresponding to each second local feature expression, and each second numerical statistical value is normalized to obtain a second local feature map. The first-level output features of different network levels can be set as square pooling operations corresponding to different preset pooling kernel sizes, and the second-level output features of different network levels can be set as square pooling operations corresponding to different preset pooling kernel sizes. The first-level output feature corresponds to a second-level output feature in the same network level. Further, the first global feature expression corresponding to each first-level output feature is extracted by the preset non-local module, the third numerical statistical value corresponding to each first global feature expression is calculated in the channel dimension, and then each third numerical statistical value is normalized to obtain each first global feature map. Similarly, the second global feature expression corresponding to each second-level output feature is extracted by the preset non-local module, the fourth numerical statistical value corresponding to each second global feature expression is calculated in the channel dimension, and then each fourth numerical statistical value is normalized to obtain each second global feature map. The channel dimension is the number of channels through which the high-quality visual media data is input into the preset prior network. The channel dimension of the preset prior network for high-quality visual media data input is consistent with the channel dimension of the preset target detection network for low-quality visual media data input corresponding to the high-quality visual media data. For example, assuming that the first local feature expression is a 4*4 matrix, the channel dimension is 4, that is, the input channel is 4, and the input channel corresponds to the 2*2 region matrix in the first local feature expression. After summing and normalizing each region matrix corresponding to each input channel in the first local feature expression, the obtained 2*2 matrix is the matrix corresponding to the first local feature map. The specific formula for generating the first local feature map and the second local feature map is as follows:

$$\phi_l(f) = \frac{\sum_{k=1}^{C} |P(f)|^2}{\left\| \sum_{k=1}^{C} |P(f)|^2 \right\|_2}$$

C is the channel dimension, P represents the square pooling operation of the preset pooling kernel size. If $\phi_l(f)$ is the first local feature map, then $f$ is the first local feature expression. If $\phi_l(f)$ is the second local feature map, then $f$ is the second local feature expression. The specific formula for generating the first global feature map and the second global feature map is as follows:

$$\phi_g(f) = \frac{\sum_{k=1}^{C} |G(f)|^2}{\left\| \sum_{k=1}^{C} |G(f)|^2 \right\|_2}$$

C is the channel dimension, G is the preset non-local module. If $\phi_g(f)$ is the first global feature map, then $f$ is the first global feature expression. If $\phi_g(f)$ is the second global feature map, then $f$ is the second global feature expression.

Operation S212, constructing the feature correlation loss based on a difference degree between each first local feature map and each second local feature map and a difference degree between each first global feature map and each second global feature map.

In this embodiment, the local feature correlation loss is calculated based on the difference degree between the first local feature map and the second local feature map at the same network level, and the global feature correlation loss is calculated based on the difference degree between the first global feature map and the second global feature map at the same network level. The feature correlation loss is constructed through the $L_2$ loss function, and the specific formula for constructing the feature correlation loss is as follows:

$$L_{RP} = \sum_i^n (L_2^l(\phi_l(f_i^t), \phi_l(f_i^p)) + L_2^g(\phi_g(f_i^t), \phi_g(f_i^p)))$$

$L_{RP}$ is the feature correlation loss, i is the network level. The initial value of i is 2, n is the total number of network levels, that is, the total number of output features of each first level or the total number of output features of each second level, and the higher the network level, the deeper the network level. $L_2^1$ is the local feature correlation loss, $L_2^8$ is the global feature correlation loss, $\phi_l(f_i^t)$ is the second local feature map, $\phi_l(f_i^p)$ is the first local feature map, $\phi_g(f_i^t)$ is the second global feature map, $\phi_l(f_i^p)$ is the first global feature map, $f_i^t$ is the second backbone network side output feature, and $f_i^p$ is the first backbone network side output feature.

Operation S22, integrating each first network high-level feature to obtain a first salient prediction map corresponding to the preset prior network, and integrating each second network high-level feature to obtain a second salient prediction map corresponding to the preset target detection network to be trained.

In this embodiment, the high-level features of each first network are hierarchically integrated through the preset hierarchical integration module to obtain the first salient prediction map corresponding to the preset prior network. The high-level features of each second network are hierarchically integrated through the preset hierarchical integration module to obtain a second salient prediction map corresponding to the preset target detection network to be trained.

Each second network high-level feature includes a first feature to be integrated, a second feature to be integrated, and a third feature to be integrated.

Figure 5:
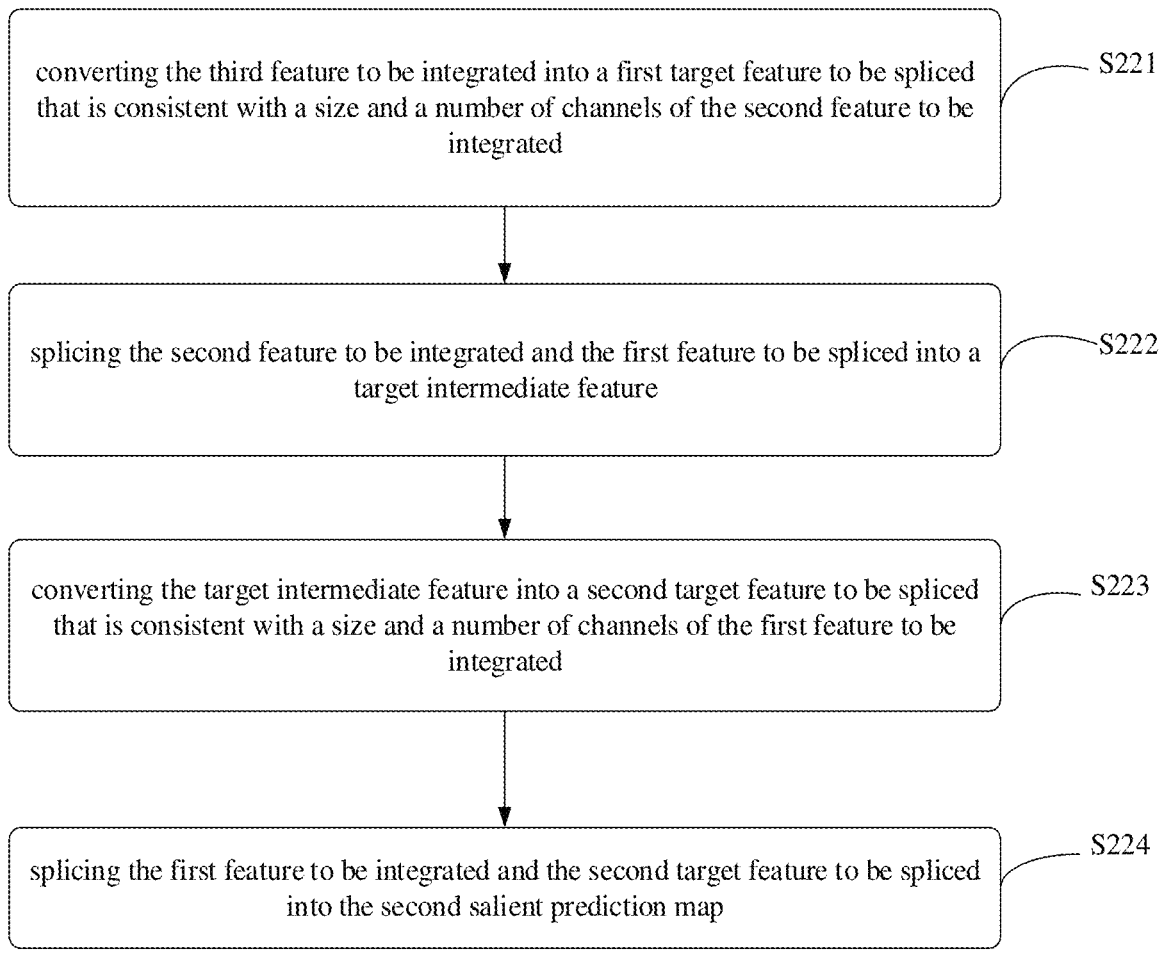
FIG. 5 is a schematic flowchart of the optimization method for constructing the target detection network according to another embodiment of the present disclosure.

As shown in FIG. 5, the operation of integrating each second network high-level feature to obtain a second salient prediction map corresponding to the preset target detection network to be trained includes the following operations.

Operation S221, converting the third feature to be integrated into a first target feature to be spliced that is consistent with a size and a number of channels of the second feature to be integrated.

In this embodiment, it is possible to perform an upsampling operation and a convolution operation on the third feature to be integrated successively, and convert the third feature to be integrated into a first target feature to be spliced that is consistent with the size and number of channels of the second feature to be integrated. The manner of the upsampling operation can be bilinear interpolation upsampling or the like.

Operation S222, splicing the second feature to be integrated and the first feature to be spliced into a target intermediate feature.

In this embodiment, a channel dimension splicing operation is performed on the second feature to be integrated and the first feature to be spliced, and the second feature to be integrated and the first feature to be spliced are spliced into a target intermediate feature.

Operation S223, converting the target intermediate feature into a second target feature to be spliced that is consistent with a size and a number of channels of the first feature to be integrated.

In this embodiment, the upsampling operation and the convolution operation are sequentially performed on the target intermediate feature, and the target intermediate feature is converted into a second target feature to be spliced with the same size and number of channels as the first feature to be integrated.

Operation S224, splicing the first feature to be integrated and the second target feature to be spliced into the second salient prediction map.

In this embodiment, it is possible to perform a channel dimension splicing operation on the first feature to be integrated and the second target feature to be spliced, and splice the first feature to be integrated and the second target feature to be spliced into the second salient prediction map.

The specific formula for generating the second salient prediction map is as follows:

$$S_c = A(f_3^t, f_4^t, f_5^t)$$

A is the preset hierarchical integration module, $S_c$, is the second salient prediction map, $f_3^t$ is the first feature to be integrated, $f_4^t$ is the second feature to be integrated, $f_5^t$ is the third feature to be integrated, and the calculation process in the preset hierarchical integration module is as follows:

$$A = Cat(f_i^t, Conv(U(Cat(f_{i+1}^t, Conv(U(f_{i+2}^t))))))$$

A is the preset hierarchical integration module, Cat is the channel dimension splicing operation, Conv is the convolution operation, U is the upsampling operation, $f_i^t$ is the first feature to be integrated, $f_{i+1}^t$ is the second feature to be integrated, and $f_{i+3}^t$ is the third feature to be integrated.

Operation S23, constructing the salient target position loss based on a difference degree of a salient target position between the first salient prediction map and the second salient prediction map.

In this embodiment, based on the size of each absolute value element in the first salient prediction map, it is possible to determine the first target network channel output corresponding to the salient target in the first salient prediction map. Based on the size of each absolute value element in the second salient prediction map, it is possible to determine the second target network channel output corresponding to the salient target in the second salient prediction map. Then, based on the difference degree between the first target network channel output and the second target network channel output, a salient target position loss is constructed.

Figure 6:
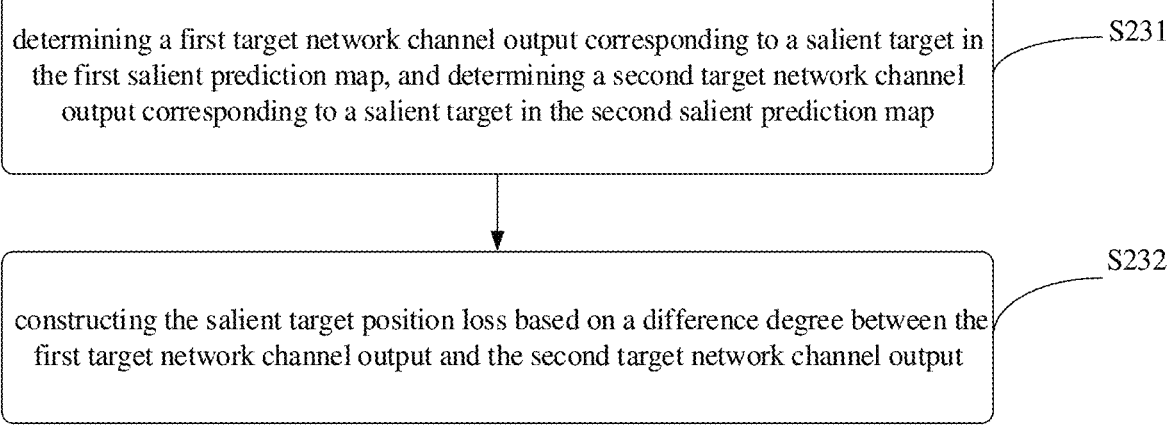
FIG. 6 is a schematic flowchart of the optimization method for constructing the target detection network according to another embodiment of the present disclosure.

As shown in FIG. 6, the operation of constructing the salient target position loss based on the difference degree of the salient target position between the first salient prediction map and the second salient prediction map includes the following operations.

Operation S231, determining a first target network channel output corresponding to a salient target in the first salient prediction map, and determining a second target network channel output corresponding to a salient target in the second salient prediction map.

In this embodiment, the largest absolute value element among the absolute value elements in the first salient prediction map is selected as the first target network channel output, and the largest absolute value element among the absolute value elements in the second salient prediction map is selected as the second target network channel output.

Operation S232, constructing the salient target position loss based on a difference degree between the first target network channel output and the second target network channel output.

In this embodiment, based on the difference degree between the first target network channel output and the second target network channel output, the salient target position loss is constructed through the loss function $L_2$, and the formula for constructing the salient target position loss is as follows:

$$L_{LP}=L_2(\max_{k=1,C}|S_{C,k}|^2, \max_{k=1,C}|S_{C,k}^p|^2)$$

$L_{LP}$ is the salient target position loss, $|S_{C,k}|^2$ is the absolute value element in the second salient prediction map, and $|S_{C,k}^p|^2$ the absolute value element in the first salient prediction map.

Operation S24, constructing the salient prediction loss based on the second salient prediction map and the true label.

In this embodiment, it is possible to convert the second salient prediction map into a predicted output label, and construct the salient prediction loss based on the difference degree between the predicted output label and the true label.

The second backbone network side output feature includes at least a network low-level feature, and the salient prediction loss includes a first salient prediction loss and a second salient prediction loss,
the operation of constructing the salient prediction loss based on the second salient prediction map and the true label includes the following operations:
constructing the first salient prediction loss based on a difference degree between a predicted output label corresponding to the second salient prediction map and the true label.

In this embodiment, a convolution operation and an upsampling operation are performed on the second salient prediction map to convert the channel dimension and size of the second salient prediction map to be consistent with the channel dimension and size of the true label. The predicted output label is obtained, and then based on the difference degree between the predicted output label and the true label, the first significant prediction loss is constructed through the cross entropy loss function. The specific process of constructing the first salient prediction loss is as follows:

$$L_{sal1}=L_{BCE}(U(\text{Conv}(S_C),y))$$

$L_{sal1}$ is the first significant prediction loss, U represents the bilinear interpolation upsampling operation to convert the size of $S_c$, to be consistent with the size of the true label, Conv is the convolution operation of 1*1 convolution kernel to convert the channel dimension of $S_c$ to be consistent with the channel dimension of the true label, y is the true label, and $S_c$ is the second salient prediction map.

A hierarchical refinement feature is constructed based on the second salient prediction map and each network low-level feature.

In this embodiment, it should be noted that since the second salient prediction map is obtained based on the integration of high-level features of each second network, the second salient prediction map has high-level semantic information. However, there is less detailed information with salient targets, that is, the second salient prediction map is relatively rough. The low-level features of the network are the forward shallow features in the preset target detection network to be trained, which have detailed information of salient targets, but have less high-level semantic information of salient targets.

Based on the hierarchical refinement feature module, the high-level semantic information in the second salient prediction map guides the selection of the detailed information of the low-level features of each network, and constructs the hierarchical refinement features. In this way, the purpose of refining the rough salient target details in the second salient prediction map is achieved, such that the third salient prediction map generated based on the hierarchical refinement features has both high-level semantic information and detailed information of salient targets, which can improve the accuracy of salient target detection.

The second salient prediction loss is constructed based on a difference degree between a third salient prediction map generated by the hierarchical refinement feature and the true label.

In this embodiment, the convolution operation and deconvolution operation are performed on the hierarchical refinement feature successively to convert the channel dimension and size of the hierarchical refinement feature to be consistent with the channel dimension and size of the true label. The third salient prediction map is obtained, and the second salient prediction loss is constructed through the cross-entropy loss function based on the difference degree between the third salient prediction map and the true label. The specific process of constructing the second salient prediction loss is as follows:

$$L_{sal2}=L_{BCE}(S_{map},y)$$

$L_{sal2}$ is the second salient prediction loss, $S_{map}$ is the third salient prediction map, and y is the true label.

Figure 7:
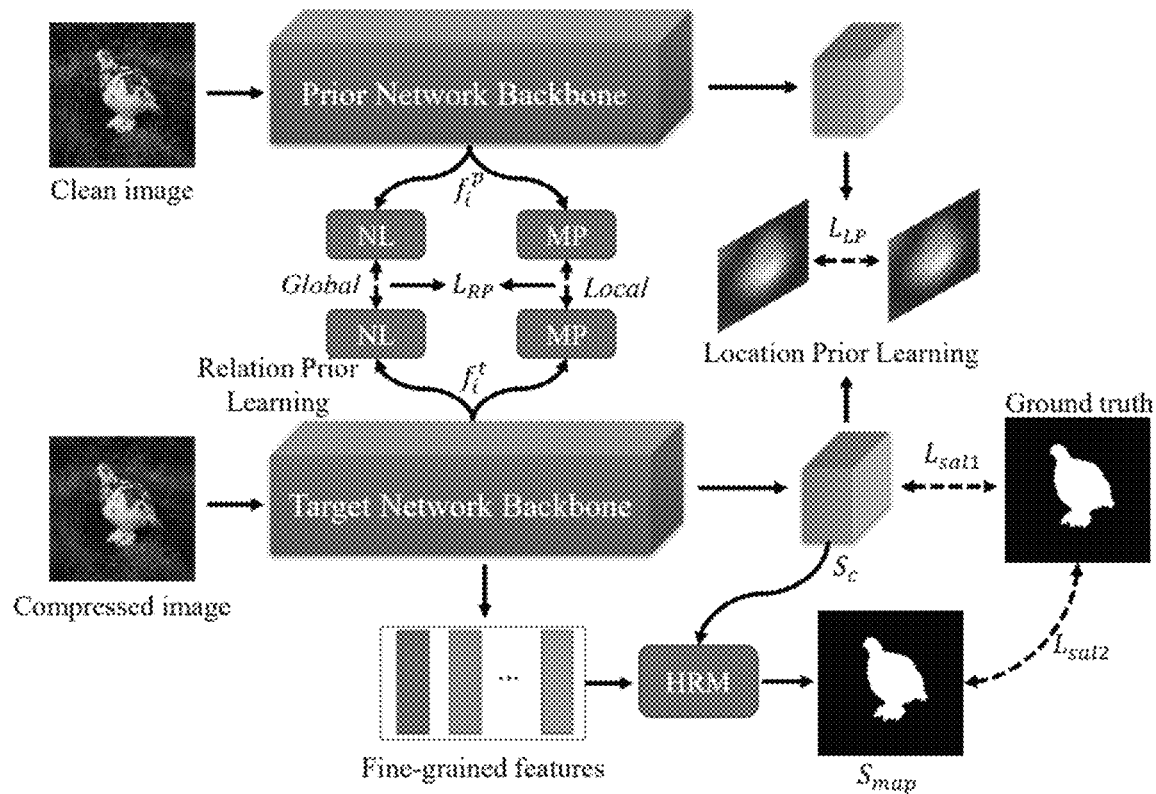
FIG. 7 is a schematic flowchart of constructing the target detection network in the optimization method for constructing the target detection network of the present disclosure.

In addition, in another embodiment, as shown in FIG. 7, FIG. 7 is a schematic flowchart of constructing a target detection network of the present disclosure. Clean image is the high-quality visual media data, Compressed image is the low-quality visual media data, Prior Network Backbone is the preset prior network, and Target Network Backbone is the preset target detection network to be trained, $f_i^p$ is the first backbone network side output feature, $f_i^t$ is the second backbone network side output feature, MP corresponding to $f_i^p$ is the first local feature map, NL corresponding to $f_i^p$ is the first global feature map, MP corresponding to $f_i^t$ is the second local feature map, NL corresponding $f_i^t$ is the second global feature map, $L_{RP}$ is the feature correlation loss, $L_{LP}$ is the salient target position loss, $S_c$, is the second salient prediction map, Fine-grained Features are the low-level features of each network, and HRM is the hierarchical refinement feature module, $S_{map}$ is the third salient prediction map, $S_{sal1}$ is the first salient prediction loss, $S_{sal2}$ is the second salient prediction loss, and Ground truth is the true label.

The embodiments of the present disclosure provide a method for constructing the feature correlation loss, the salient target position loss, and the salient prediction loss. That is, a feature correlation loss representing the correlation between the preset prior network and the preset target detection network to be trained is constructed based on the difference degree between the first backbone network side output feature and the second backbone network side output feature. The high-level features of each of the first networks are integrated to obtain a first salient prediction map corresponding to the preset prior network, and the high-level features of each of the second networks are integrated to obtain a second salient prediction map corresponding to the preset target detection network to be trained. The salient target position loss is constructed based on the difference degree of salient target positions between the first salient prediction map and the second salient prediction map, and the salient prediction loss is constructed based on the second salient prediction map and the true label. The preset target detection network to be trained is optimized based on the feature correlation loss, the salient target position loss, and the salient prediction loss, which can achieve the purpose of transferring the prior information in the preset prior network to the preset target detection network to be trained through the feature correlation loss, to ensure that the features extracted from the low-quality visual media data by the preset target detection network to be trained are as close as possible to the features extracted from the high-quality visual media data by the preset prior network, and which can achieve the purpose of ensuring the consistency of the position of the salient target in the positioning image of the preset prior network and the preset target detection network to be trained through the salient target position loss, and can realize the purpose of ensuring the prediction accuracy of the preset target detection network to be trained compared to the true label through the salient target position loss, thereby obtaining the target detection network that has learned the knowledge of the prior network, such that the target detection network can perform accurate salient target detection on high-quality visual media data as a preset prior network, to perform accurate salient target detection on low-quality visual media data, without relying on high-quality visual media data for salient target detection. Therefore, in order to overcome the difficulty of accurately detecting salient targets on low-quality visual media data due to the high dependence of existing salient target detection networks on high-quality clean images, the existing salient target detection network has laid a foundation for the technical defects of low detection accuracy of low-quality visual media data.

Figure 8:
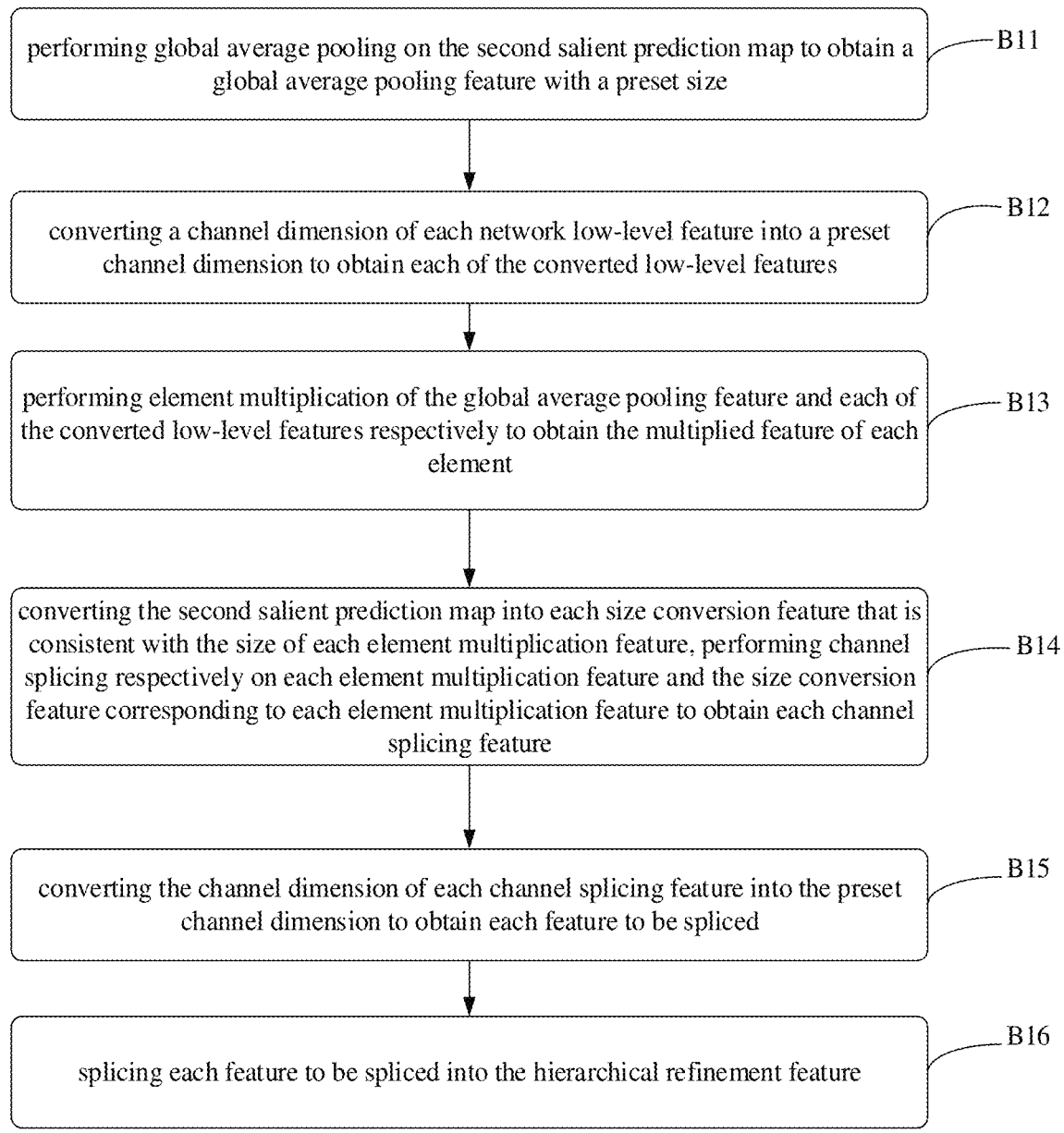
FIG. 8 is a schematic flowchart of the optimization method for constructing the target detection network according to another embodiment of the present disclosure.

Further, as shown in FIG. 8, in another embodiment of the present disclosure, the operation of constructing a hierarchical refinement feature based on the second salient prediction map and each network low-level feature includes the following operations.

Operation B11, performing global average pooling on the second salient prediction map to obtain a global average pooling feature with a preset size.

In this embodiment, it should be noted that the preset size is the size determined by the channel dimension of the input feature of the preset target detection network to be trained. For example, assuming that the dimension of the channel is C, the preset size can be set to 1*1*C*1.

The global average pooling is performed on the second salient prediction map to convert the size of the second salient prediction map into a preset size to obtain global average pooling features.

Operation B12, converting a channel dimension of each network low-level feature into a preset channel dimension to obtain each of the converted low-level features.

In this embodiment, a convolution operation is performed on the low-level features of each network to convert the channel dimension of the low-level features of each network into the channel dimension of the input feature of the preset target detection network to be trained, and each converted low-level feature with the preset channel dimension is obtained.

Operation B13, performing element multiplication of the global average pooling feature and each of the converted low-level features respectively to obtain the multiplied feature of each element.

In this embodiment, element multiplication of the global average pooling feature and each of the converted low-level features is performed to obtain an element multiplication feature corresponding to each of the converted low-level features.

Operation B14, converting the second salient prediction map into each size conversion feature that is consistent with the size of each element multiplication feature, performing channel splicing respectively on each element multiplication feature and the size conversion feature corresponding to each element multiplication feature to obtain each channel splicing feature.

In this embodiment, the following operations are performed for each element multiplication feature.

Converting the second salient prediction map into a size conversion feature that is consistent with the size of the element multiplication feature, and performing a channel dimension splicing operation on the element multiplication feature and the size conversion feature to obtain a channel splicing feature.

Operation B15, converting the channel dimension of each channel splicing feature into the preset channel dimension to obtain each feature to be spliced.

Operation B16, splicing each feature to be spliced into the hierarchical refinement feature.

Figure 9:
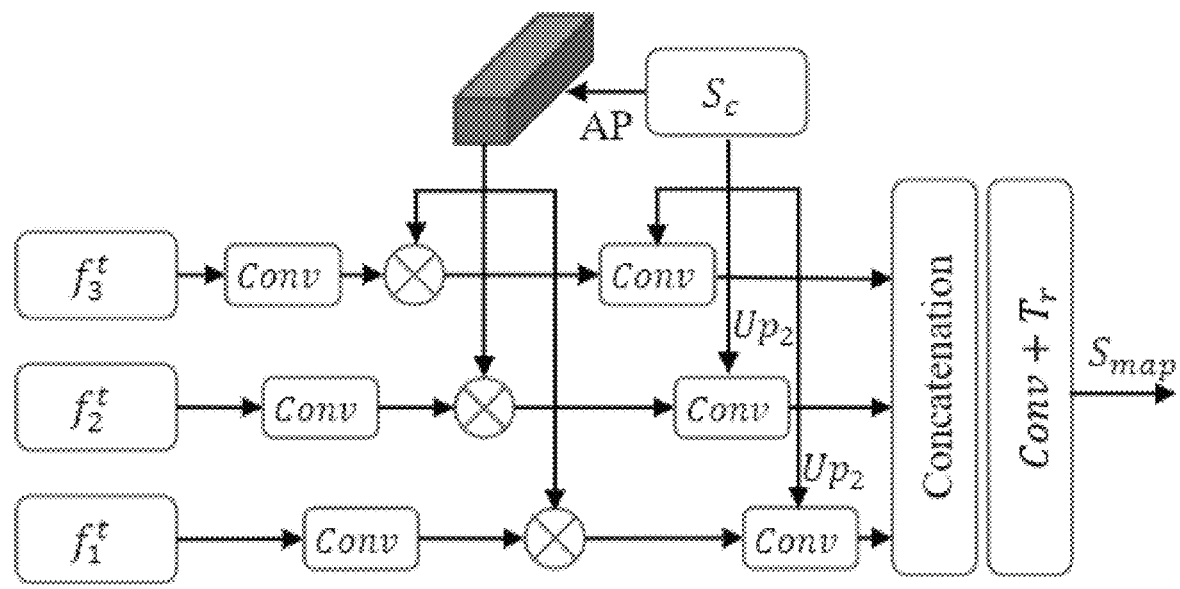
FIG. 9 is a schematic flowchart of obtaining a third salient prediction map by generating the hierarchical refinement feature in the optimization method for constructing the target detection network of the present disclosure.

In this embodiment, a channel dimension splicing operation is performed on each of the spliced features to obtain the hierarchical refinement feature. In another implementation manner, as shown in FIG. 9, FIG. 9 is a schematic flowchart of obtaining the third salient prediction map by generating the hierarchical refinement feature. $S_c$, is the second salient prediction map, AP represents the global average pooling operation, to convert the size of $S_c$, into 1*C*1*1, and generate global average pooling feature, C is the preset channel dimension, $f_1'$, $f_2'$, and $f_3'$ are the network low-level feature, the size of $f_3'$ is consistent with the size of $S_c$, both the size of $f_1'$ and $f_2'$ is twice the size of $S_c$, Conv is the convolution operation to convert channel dimension to preset channel dimension, $\otimes$ is the symbol for element multiplication, $Up_2$ is a 2-fold upsampling operation to convert the size to be consistent with $S_c$, and perform the channel dimension splicing operation by multiplying the features with the corresponding elements respectively, and the number of channels after splicing becomes 2C. Therefore, the spliced features of each channel are then converted, and the number of channels is C, Concatenation is a cat operation, that is, a channel dimension splicing operation, for splicing the features to be spliced into the hierarchical refinement feature, $T_r$ is the deconvolution operation, and finally, the convolution and deconvolution operations are sequentially performed on the hierarchical refinement feature, so as to obtain a third salient prediction map.

Figure 10:
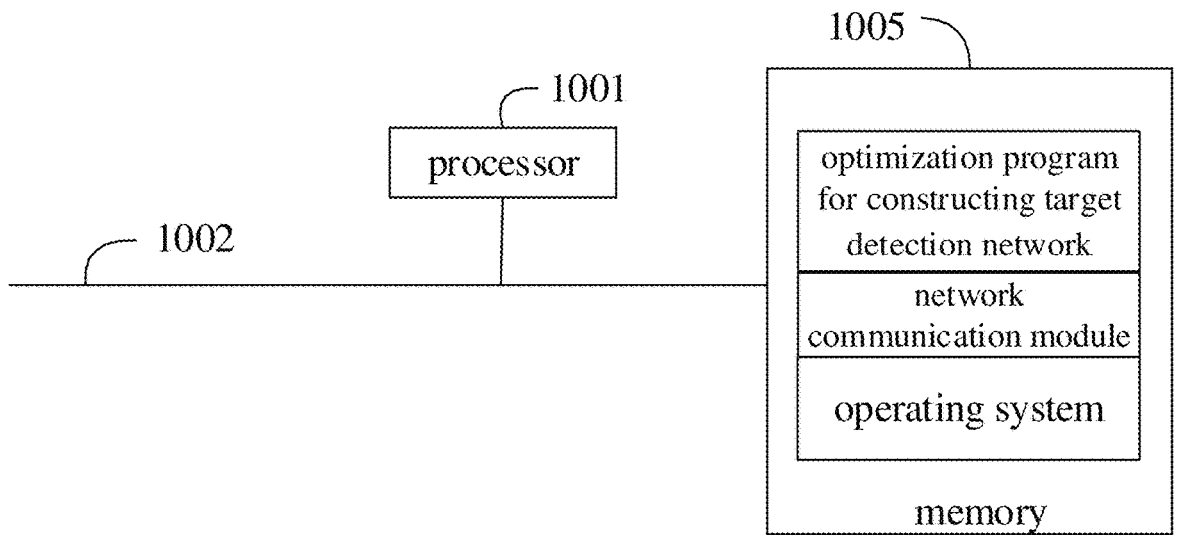
FIG. 10 is a schematic structural diagram of a device in the hardware operating environment according to an embodiment of the present disclosure.

As shown in FIG. 10, FIG. 10 is a schematic structural diagram of a device in the hardware operating environment according to an embodiment of the present disclosure.

An optimization device for constructing a target detection network includes a processor 1001, such as a CPU, a memory 1005, and a communication bus 1002. The communication bus 1002 is used to realize the connection communication between the processor 1001 and the memory 1005. The memory 1005 can be high-speed RAM memory, or can be non-volatile memory, such as disk memory. Optionally, the memory 1005 can also be a storage device independent of the aforementioned processor 1001.

In an embodiment, the optimization device for constructing the target detection network can also include a rectangular user interface, a network interface, a camera, a Radio Frequency (RF) circuit, a sensor, an audio circuit, a WiFi module, etc. The rectangular user interface can include a display screen, an input sub-module such as a keyboard. The rectangular user interface can also include standard wired and wireless interfaces. The network interface can include a standard wired interface and a wireless interface (such as a WI-FI interface).

Those skilled in the art should understand that the optimization device for constructing the target detection network shown in FIG. 5 does not constitute a limitation on the optimization device for constructing the target detection network, and can include more or fewer components, a combination of some components, or differently arranged components than shown in the figure.

As shown in FIG. 10, the memory 1005 as a computer storage medium can include an operating system, a network communication module, and a target detection network construction optimization program. The operating system is a program that manages and controls the hardware and software resources of the optimization device for constructing the target detection network, and supports the operation of the target detection network construction optimization program and other software and/or programs. The network communication module is used to realize the communication between various components in the memory 1005, and communicate with other hardware and software in the optimization system for constructing the target detection network.

In the optimization device for constructing the target detection network as shown in FIG. 10, the processor 1001 is configured to execute the target detection network construction optimization program stored in the memory 1005 to implement the operations of the optimization method for constructing the target detection network as described above.

The specific implementation manners of the optimization device for constructing the target detection network of the present disclosure are basically the same as those of the above-mentioned optimization method for constructing the target detection network, and are not repeated here.

The embodiments of the present disclosure further provide an optimization apparatus for constructing a target detection network applied to an optimization device for constructing a target detection network, comprising:

an extraction module for obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data;

a loss construction module for constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label; and an optimization module for optimizing the preset target detection network to be trained based on the feature correlation loss, the salient target position loss, and the salient prediction loss to obtain the target detection network.

In an embodiment, the loss construction module is further configured for:
constructing the feature correlation loss representing the correlation between the preset prior network and the preset target detection network to be trained based on a difference degree between the first backbone network side output feature and the second backbone network side output feature;

integrating each first network high-level feature to obtain a first salient prediction map corresponding to the preset prior network, and integrating each second network high-level feature of to obtain a second salient prediction map corresponding to the preset target detection network to be trained;

constructing the salient target position loss based on a difference degree of a salient target position between the first salient prediction map and the second salient prediction map; and constructing the salient prediction loss based on the second salient prediction map and the true label.

In an embodiment, the loss construction module is further configured for:
bone network side output feature, and extracting each second local feature map and each second global feature map from the second backbone network side output feature; and constructing the feature correlation loss based on a difference degree between each first local feature map and each second local feature map and a difference degree between each first global feature map and each second global feature map.

In an embodiment, the loss construction module is further configured for:
performing global average pooling on the second salient prediction map to obtain a global average pooling feature with a preset size;

converting a channel dimension of each network low-level feature into a preset channel dimension to obtain each converted low-level feature;

performing element multiplication with the global average pooling feature and each converted low-level feature respectively to obtain a multiplied feature of each element;

converting a channel dimension of each channel splicing feature into the preset channel dimension to obtain each feature to be spliced; and splicing each feature to be spliced into the hierarchical refinement feature.

In an embodiment, the loss construction module is further configured for:
converting the third feature to be integrated into a first target feature to be spliced that is consistent with a size and a number of channels of the second feature to be integrated;

splicing the second feature to be integrated and the first feature to be spliced into a target intermediate feature;

converting the target intermediate feature into a second target feature to be spliced that is consistent with a size and a number of channels of the first feature to be integrated; and splicing the first feature to be integrated and the second target feature to be spliced into the second salient prediction map.

In an embodiment, the optimization module is further configured for:
determining whether the preset target detection network to be trained is converged based on the feature correlation loss, the salient target position loss, and the salient prediction loss;

regarding the preset target detection network to be trained as the target detection network when the preset target detection network to be trained is converged; or updating the preset target detection network to be trained based on the feature correlation loss, the salient target position loss, and the salient prediction loss when the preset target detection network to be trained is not converged, and obtaining the high-quality visual media data, the low-quality visual media data corresponding to the high-quality visual media data, and the corresponding true label.

The specific implementations of the optimization apparatus for constructing a target detection network in the present disclosure are basically the same as the embodiments of the above-mentioned optimization methods for constructing a target detection network, which will not be repeated here.

An embodiment of the present disclosure provides a medium, the medium is a readable storage medium, and the readable storage medium stores one or more programs. The one or more programs may also be executed by one or more processors for implementing the steps of the optimization method for constructing the target detection network described in any one of the above.

The specific implementation manner of the readable storage medium of the present disclosure is basically the same as that of the above-mentioned optimization method for constructing the target detection network, and details are not described herein.

The embodiment of the present disclosure provides a product, the product is a computer program product. The computer program product includes one or more computer programs. The one or more computer programs can also be executed by one or more processors for implementing the operations of the optimization method for constructing the target detection network described in any one of the above.

The specific implementation manner of the computer program product of the present disclosure is basically the same as the above-mentioned embodiments of the optimization method for constructing the target detection network, which will not be repeated herein.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. An optimization method for constructing a target detection network, comprising:
obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data;
constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label; and
optimizing the preset target detection network to be trained based on the feature correlation loss, the salient target position loss, and the salient prediction loss to obtain the target detection network,
wherein the feature correlation loss is a loss of feature expression in a middle hidden layer of the preset prior network configured to prompt the target detection network to be trained to learn the preset prior network,
the salient target position loss is configured to represent a difference degree between a position of a salient target obtained by salient target localization performed by the preset prior network and a position of a salient target obtained by salient target localization performed by the preset target detection network to be trained, and the salient target position loss is a loss of knowledge configured to prompt the preset target detection network to be trained to learn the preset prior network for salient target localization, and
the salient prediction loss is configured to represent a difference degree between a predicted label corresponding to a salient prediction result of the preset prior network and a true label.

2. The optimization method of claim 1, wherein the first backbone network side output feature comprises at least a first network high-level feature, and the second backbone network side output feature comprises at least a second network high-level feature,
constructing the feature correlation loss representing the correlation between the preset prior network and the preset target detection network to be trained and constructing the salient target position loss and the salient prediction loss representing salient target positioning between the preset prior network and the preset target detection network to be trained based on the first backbone network side output feature, the second backbone network side output feature, and the true label comprises:
constructing the feature correlation loss representing the correlation between the preset prior network and the preset target detection network to be trained based on a difference degree between the first backbone network side output feature and the second backbone network side output feature;
integrating each first network high-level feature to obtain a first salient prediction map corresponding to the preset prior network, and integrating each second network high-level feature of to obtain a second salient prediction map corresponding to the preset target detection network to be trained;
constructing the salient target position loss based on a difference degree of a salient target position between the first salient prediction map and the second salient prediction map; and
constructing the salient prediction loss based on the second salient prediction map and the true label.

3. The optimization method of claim 2, wherein constructing the feature correlation loss representing the correlation between the preset prior network and the preset target detection network to be trained based on the difference degree between the first backbone network side output feature and the second backbone network side output feature comprises:
extracting each first local feature map and each first global feature map from the first backbone network side output feature, and extracting each second local feature map and each second global feature map from the second backbone network side output feature; and
constructing the feature correlation loss based on a difference degree between each first local feature map and each second local feature map and a difference degree between each first global feature map and each second global feature map.

4. The optimization method of claim 2, wherein constructing the salient target position loss based on the difference degree of the salient target position between the first salient prediction map and the second salient prediction map comprises:
determining a first target network channel output corresponding to a salient target in the first salient prediction map, and determining a second target network channel output corresponding to the salient target in the second salient prediction map; and
constructing the salient target position loss based on a difference degree between the first target network channel output and the second target network channel output.

5. The optimization method of claim 2, wherein the second backbone network side output feature comprises at least a network low-level feature, and the salient prediction loss comprises a first salient prediction loss and a second salient prediction loss,
constructing the salient prediction loss based on the second salient prediction map and the true label comprises:
constructing the first salient prediction loss based on a difference degree between a predicted output label corresponding to the second salient prediction map and the true label;
constructing a hierarchical refinement feature based on the second salient prediction map and each network low-level feature; and
constructing the second salient prediction loss based on a difference degree between a third salient prediction map generated by the hierarchical refinement feature and the true label.

6. The optimization method of claim 5, wherein constructing the hierarchical refinement feature based on the second salient prediction map and each network low-level feature comprises:
performing global average pooling on the second salient prediction map to obtain a global average pooling feature with a preset size;
converting a channel dimension of each network low-level feature into a preset channel dimension to obtain each converted low-level feature;
performing element multiplication with the global average pooling feature and each converted low-level feature respectively to obtain a multiplied feature of each element;
converting a channel dimension of each channel splicing feature into the preset channel dimension to obtain each feature to be spliced; and
splicing each feature to be spliced into the hierarchical refinement feature.

7. The optimization method of claim 2, wherein each second network high-level feature comprises a first feature to be integrated, a second feature to be integrated, and a third feature to be integrated,
integrating each second network high-level feature to obtain the second salient prediction map corresponding to the preset target detection network to be trained comprises:
converting the third feature to be integrated into a first target feature to be spliced that is consistent with a size and a number of channels of the second feature to be integrated;
splicing the second feature to be integrated and the first feature to be spliced into a target intermediate feature;
converting the target intermediate feature into a second target feature to be spliced that is consistent with a size and a number of channels of the first feature to be integrated; and
splicing the first feature to be integrated and the second target feature to be spliced into the second salient prediction map.

8. The optimization method of claim 1, wherein optimizing the preset target detection network to be trained based on the feature correlation loss, the salient target position loss, and the salient prediction loss to obtain the target detection network comprises:
determining whether the preset target detection network to be trained is converged based on the feature correlation loss, the salient target position loss, and the salient prediction loss;
regarding the preset target detection network to be trained as the target detection network when the preset target detection network to be trained is converged; or
updating the preset target detection network to be trained based on the feature correlation loss, the salient target position loss, and the salient prediction loss when the preset target detection network to be trained is not converged, and obtaining the high-quality visual media data, the low-quality visual media data corresponding to the high-quality visual media data, and the corresponding true label.

9. An optimization apparatus for constructing a target detection network, comprising:
an extraction module for obtaining high-quality visual media data, low-quality visual media data corresponding to the high-quality visual media data, and a corresponding true label, extracting a first backbone network side output feature generated by a preset prior network for the high-quality visual media data, and extracting a second backbone network side output feature generated by a preset target detection network to be trained for the low-quality visual media data;
a loss construction module for constructing a feature correlation loss representing a correlation between the preset prior network and the preset target detection network to be trained and constructing a salient target position loss and a salient prediction loss representing salient target positioning between the preset prior network and the preset target detection network to be trained based on the first backbone network side output feature, the second backbone network side output feature, and the true label; and
an optimization module for optimizing the preset target detection network to be trained based on the feature correlation loss, the salient target position loss, and the salient prediction loss to obtain the target detection network,
wherein the feature correlation loss is a loss of feature expression in a middle hidden layer of the preset prior network configured to prompt the target detection network to be trained to learn the preset prior network,
the salient target position loss is configured to represent a difference degree between a position of a salient target obtained by salient target localization performed by the preset prior network and a position of a salient target obtained by salient target localization performed by the preset target detection network to be trained, and the salient target position loss is a loss of knowledge configured to prompt the preset target detection network to be trained to learn the preset prior network for salient target localization, and the salient prediction loss is configured to represent a difference degree between a predicted label corresponding to a salient prediction result of the preset prior network and a true label.

10. An optimization device for constructing a target detection network, comprising: a memory, a processor, a program stored on the memory for implementing an optimization method for constructing a target detection network, the memory is configured for storing a program for implementing the optimization method for constructing the target detection network, the processor is configured to execute the program for implementing the optimization method for constructing the target detection network, to perform operations of the optimization method for constructing the target detection network according to claim 1.

11. A non-transitory computer readable storage medium, wherein a program for implementing an optimization method for constructing a target detection network is stored on the non-transitory computer readable storage medium, and a processor is configured to execute the program for implementing the optimization method for constructing the target detection network, to perform operations of the optimization method for constructing the target detection network according to claim 1.

* * * * *